United States Patent [19]

Stolz et al.

[11] Patent Number: 5,040,844
[45] Date of Patent: Aug. 20, 1991

[54] METHOD AND ARRANGEMENT FOR WINDOW MOUNTING IN A FLEXIBLE ROOF

[75] Inventors: Josef Stolz, Flieden; Rainer Gossmann, Fulda, both of Fed. Rep. of Germany

[73] Assignee: Mehler Vario System GmbH, Fulda, Fed. Rep. of Germany

[21] Appl. No.: 443,260

[22] Filed: Nov. 29, 1989

[30] Foreign Application Priority Data

Dec. 6, 1988 [DE] Fed. Rep. of Germany ....... 3841035

[51] Int. Cl.5 ............................................. B60J 7/08
[52] U.S. Cl. ..................................... 296/107; 296/201
[58] Field of Search ............... 296/107, 116, 147, 146, 296/201; 219/203

[56] References Cited

U.S. PATENT DOCUMENTS 3,096,117  7/1963  Hallenbeck ......................... 296/107

FOREIGN PATENT DOCUMENTS 284931  10/1988  European Pat. Off. ............ 296/147
294598  12/1988  European Pat. Off. ............ 296/107

Primary Examiner—Margaret A. Focarino
Assistant Examiner—Gary C. Hoge
Attorney, Agent, or Firm—Hovey, Williams, Timmons & Collins

[57] ABSTRACT

The invention relates to an arrangement for mounting a window in a flexible roof, and in particular the flexible folding roof of a vehicle and a method for making a releasable window connection in such a roof. The support band (6) of a zip fastener (3) is secured to the inner side of a roof cover (2) and the other support band (7) of the zip fastener (3) is secured to the inner side of the window pane (1). At least one peripheral strip (4) is provided between the window pane (1) and the roof cover (2) with the inner side of the peripheral strip (4) secured to the outer peripheral region of the window pane (1) by sewing and/or adhesion. An adhesive bond (5) consisting of a hot-melt adhesive is provided between the peripheral strip (4) and the roof cover (2). Electrical resistance heating conductors (10) are introduced into the hot-melt adhesive layer to which a voltage is applied to soften the hot-melt adhesive.

23 Claims, 2 Drawing Sheets

METHOD AND ARRANGEMENT FOR WINDOW MOUNTING IN A FLEXIBLE ROOF

BACKGROUND OF THE INVENTION

1. Field of the Invention

This invention relates to an arrangement for a window mounting in a flexible top or hood, particularly a flexible folding top or roof of a vehicle, and a method for making a releasable window connection in such a top or roof.

2. Description of the Prior Art

Like the tops or roof of other motor vehicles, convertible roofs must be provided with a rear window to give the driver a view to the rear. When such a vehicle is open, the convertible roof is generally folded down rearwardly, and consequently the rear windows must also be made from a foldable, flexible material. Transparent plastic polymers can be used for this purpose. Usually, the outer covers of such folding roofs are adhered, sewn or riveted to the rear window at the peripheral region thereof.

A decisive disadvantage of such roofs is that the rear window must be worked into the outer covering of the roof before it is fitted. When the roof itself is then fitted, the rear window can be deformed or scratched. In addition, such connections are not adequately secured against air inclusions and moisture. The flexible window material has only a restricted stability under load and can scratch to such an extent that the view through the window material is impaired. At low ambient temperatures, the window material may become stiff and tend to crack as well as becoming brittle due to continuous exposure to UV radiation so that during folding of the roof, the window can crack or break prematurely.

The resulting damage often leads to premature replacement of the rear panes of convertible tops. This involves considerable expenditure. In general, the entire roof must be dismantled, the old pane cut out, a new one sewn, adhered or welded in prior to remounting the roof on the vehicle.

In addition, complimentary profile rods are used as a connection means between the outer cover and the rear window pane. The profile rods can be locked together by their complemental mutual form and mutual engagement in the taut state of the roof. In such state, the interlocking rods cannot be released from the outside of the roof without its destruction. One of the profile rods is fixedly connected to the peripheral edge of the window opening and the other profile rod is fixedly connected to the peripheral edge of the window insert.

These profile rods are very difficult to make and difficult to join together because the profile rods comprising the connecting means between the outer cover and the window pane and extending all around the pane must be engaged. Moreover, the connecting means have a thickness in the connecting region which impairs the appearance of the window frame due to the thickness of the profile strips or rods. In addition, such profile rods do not meet the demands for resistance to theft and external weather influences such as moisture and air stream.

Therefore, the present invention seeks to overcome the problem of providing an arrangement for window mounting in a flexible hood, and in particular the flexible folding roof of a vehicle, in which the rear window pane can be fitted affter completion of the folding hood and possibly only after mounting of the folding hood to the rear window pane. The desired arrangement seeks to meet the usual demands for resistance to theft and not removable from the outside with simple means. In this context, simple means denotes those means which do not lead to damage or destruction of the roof. In addition, the invention must fulfill the conventional requirements, that is the bond between the window and the roof must also be particularly tight to prevent any rain water from entering the vehicle. The joint between the window insert and the roof must also, as before, ensure that the roof can, if necessary, be bent or folded in the window region. The invention also seeks to provide a method for establishing a releasable window connection in a flexible roof.

SUMMARY OF THE INVENTION

These problems are largely solved according to the present invention wherein the peripheral edge of a window pane and the peripheral edge of the roof cover are each provided with one part of a divisible zip fastener whereby the window pane is fixable in the roof cover. Both the window pane and the roof cover are provided with at least one side along their peripheral edges on the roof side having peripheral strips which cover the zip fastener and mutually overlap. The peripheral strips are bonded together in their overlapping region by means of a sealing detachable adhesive bond.

The method for making a releasable window connection in a flexible roof in accordance with the present invention is characterized by the following step:

a) Securing a support band of a divisible zip fastener along the window opening of a roof cover such that the edge of the opening of the roof cover covers the chain of the zip fastener in the form of a peripheral strip;

b) Securing the other support band of the zip faster along the peripheral edge of a window pane in a manner such that the chain of the zip fastener is disposed at a distance from the edge of the pane;

c) Securing a flexible peripheral strip along the peripheral edge of the window pane, with a portion of the peripheral strip extending beyond the edge of the pane and covering the zip fastener chain;

d) Inserting the pane into the roof cover by closing the zip fastener;

e) Applying a releasable adhesive to the opposing overlapping regions of the peripheral strip at the window pane and/or the peripheral strip at the roof cover;

f) Activating the adhesive; and g) Pressing together the peripheral strips for establishing a sealed adhesive bond.

The method in accordance with the invention hereof and the arrangement for the window mounting in a flexible roof is more fully developed in the drawing and the following description and claims. In accordance with the method the window pane may be fitted to the roof after completion of the roof and possibly after fitting the roof to the vehicle. The window mounting hereof is configured so that it cannot be detached without the external application of force and serves to completely seal the joint against external weathering influences such as the instrusion of moisture.

DESCRIPTION OF THE PREFERRED EMBODIMENT

Figure 1:
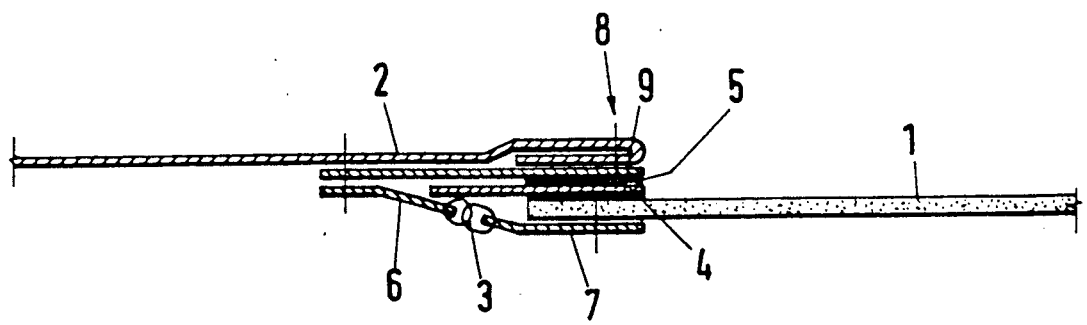
FIGS. 1 and 2 are enlarged cross-sectional views of the window mounting in accordance with the present invention showing a flexible hood cover and a window pane, with a zip fastener joined to the pane and a fabric frame by an adhesive bond activatable by electrical resistance heating conductors.
Figure 2:
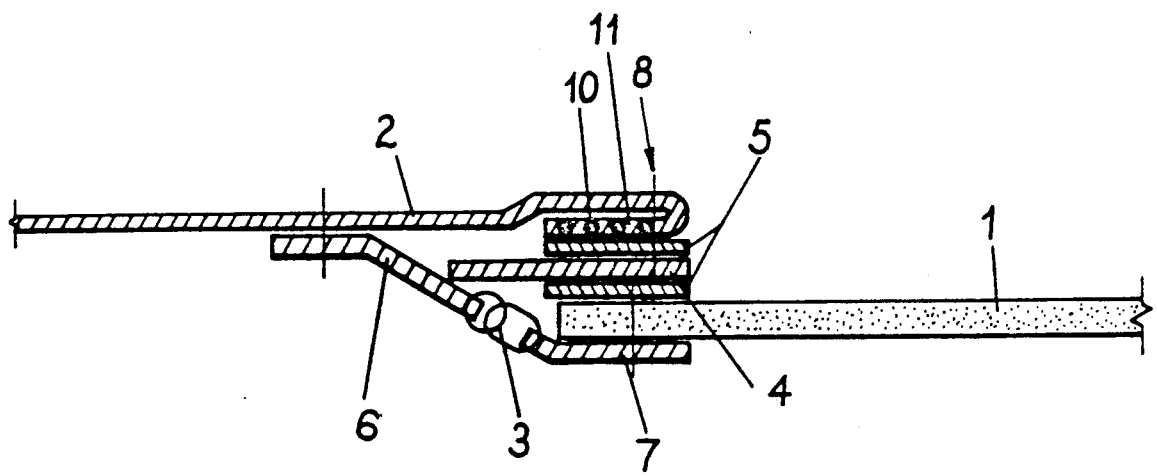

Referring now to the drawing, a roof 8 for a convertible vehicle broadly includes a window pane 1 and a fabric cover 2. The window pane 1 consists of a transparent flexible plastic material and the roof cover 2 of a weather-proof moisture-repellant textile material. Preferably, the hood cover 2 is folded over inwardly in the region of the window opening, i.e. along the peripheral edge of the cover. The folded region 11 being bonded to the remainder of the hood cover 2 preferably by means of a latex adhesive to form an outer or cover-side peripheral strip. In addition, the folded region 11 can be strengthened and sealed by quilt seams. In the attached drawings the quilt seams are represented by perpendicular lines.

The support band 7 of a zip fastener 3 is secured at the inner side of the window pane 1 at the peripheral region thereof. The support band 7 can be secured by means of adhesion, fusion and/or sewing. The other support band 6 of the zip fastener 3 is secured by adhesion and/or sewing to the inner side of the roof cover 2 at an adequate distance from the peripheral edge thereof.

A peripheral strip 4 is provided between the hood or roof cover 2 and the window pane 1. The peripheral strip 4 is secured to the outer side of the window pane 1 at the peripheral region thereof by adhesion and/or sewing. The peripheral strip 4 extends outwardly and covers the chain of the zip fastener 3. The slide of the zip fastener points toward the roof cover (2).

In the preferred embodiment shown in the drawing, a fabric frame 9 is located between the peripheral strip 4 and the fold region 11 of the roof cover 2. The fabric frame 9 extends to the region where the support band 6 is secured to the roof cover 2. The fabric frame 9 can also be considered an encircling frame which is secured to the remaining frame of a window pane which has been removed and to which a new pane can then be secured.

In the present embodiment, the outer edge region of the fabric frame 9 is located in the securing region of the support band 6 and is thus secured with the latter to the roof cover 2, for example by adhesion and/or sewing. An adhesive bond 5 is provided between the peripheral strip 4 and the fabric frame 9. The adhesive bond 5 consists of a layer of hot-melt having a base of ethylvinyl acetate, polyamide, polyester or reactable polyurethane. Electrical resistance heating conductors 10 are incorporated into the adhesive layer or adhesive bond 5. The electrical resistance heating conductors can be heated to soften the adhesive on connection to an outer voltage source, preferably in the range of 6 to 42 V. The electrical resistance heating conductors 10 consist preferably of heating wires, a heating strip or a heating wire mesh. It is also possible to weave the electrical resistance heating conductors directly into the fabric parts to be joined.

In certain applications, the fabric frame 9 can also be omitted so that the adhesive bond 5 is exposed between the peripheral strip 4 and the roof cover 2.

In performing the method in accordance with the present invention one support band 6 is first secured to a divisible zip fastener 3 along the window opening in the roof cover 2. The support band 6 is secured whereby the edge of the roof cover 2 covers the zip fastener chain in the form of a peripheral strip. Thereafter, the other support band 7 of the zip fastener 3 is secured along the peripheral edge of the window pane 1 whereby the zip fastener chain is located at a distance from the pane edge and covers the zip fastener chain 3. Thereafter, the window pane 1 is installed into the roof by moving the slide of the zip fastener 3 to interconnect the chain 3. A releasable adhesive is then applied to the overlapping opposite regions of the peripheral strip 4 on the window pane and/or the peripheral strip of the hood cover 2. The adhesive may then be activated by applying a voltage of between 6 and 42 V to the electrical resistance heating conductors 10. Thereafter, the peripheral strips are pressed against each other to form a sealed adhesive bond.

We claim:

1. An arrangement for securing a window in a flexible roof, and in particular the flexible folding roof of a vehicle, comprising:
   a window pane having an intended outer side and an intended inner side and presenting a peripheral edge;
   a roof cover having an intended outer side and an intended inner side and presenting a peripheral edge defining a window opening, said roof cover being adapted for receiving said pane within said window opening;
   a divisible zip fastener having a first part secured to said peripheral edge of said roof cover and a second part secured in close proximity to the said peripheral edge of said window pane;
   a cover-side peripheral strip attached along said peripheral edge of said roof cover in covering relationship to said first part of said zip fastener;
   a peripheral strip provided along said peripheral edge of said window pane in covering relationship to said second part of said zip fastener,
   said cover-side peripheral strip and said peripheral strip being oriented to present an overlapping region therebetween;
   a sealing detachable adhesive bond bonding together said cover-side peripheral strip and said peripheral strip at said overlapping region; and
   and electric resistance heating conductor located in said ovelapping region and adapted for connection to an external voltage source for softening said adhesive.

2. An arrangement as set forth in claim 1, wherein said adhesive bond is a hot-melt adhesive.

3. An arrangement as set forth in claim 2, wherein said hot-melt adhesive comprises a member selected from the group consisting of ethylvinyl acetate, polyamide, polyester and reactable polyurethane.

4. An arrangement as set forth in claim 2, including an electric resistance heating conductor located in said overlapping region and adapted for connection to an external voltage source for softening said adhesive.

5. An arrangement as set forth in claim 1, wherein said resistant heating conductor is woven into at least one of the parts to be bonded together.

6. An arrangement as set forth in claim 1, wherein said heating conductor includes an element selected from the group consisting of a heating wire, heating strip and a heating wire mesh.

7. An arrangement as set forth in claim 1, wherein said first part and said second part of said divisible zip fastener each include a support band, said support band of said first part of said zip fastener being secured to the intended inner side of the roof cover and said peripheral strip being secured to the intended outer side of said window pane.

8. An arrangement as set forth in claim 7, wherein said support band of said first part of said zip fastener is secured to the roof cover at a sufficient distance from the peripheral edge of the roof cover whereby a portion of the roof cover adjacent the peripheral edge is folded inwardly to comprise said cover-side peripheral strip.

9. An arrangement as set forth in claim 8, wherein said cover-side peripheral strip further includes a fabric frame member adhesively bonded to said peripheral strip.

10. An arrangement as set forth in claim 9, wherein said fabric frame is located more proximate said roof cover than said peripheral strip.

11. An arrangement as set forth in claim 10, wherein said fabric frame covers the entire peripheral strip.

12. An arrangement as set forth in claim 7, wherein said support band of said second part of said divisible zip fastener is sewn to the peripheral edge of said window pane.

13. An arrangement as set forth in claim 7, wherein said support band of said second part of said divisible zip fastener is adhered to the peripheral edge of said window pane.

14. An arrangement as set forth in claim 7, wherein said support band of said second part of said divisible zip fastener is fused to the peripheral edge of said window pane.

15. An arrangement as set forth in claim 1, wherein said peripheral strip is sewn to the peripheral edge of said window pane.

16. An arrangement as set forth in claim 1, wherein said peripheral strip is adhered to the peripheral edge of said window pane.

17. An arrangement as set forth in claim 1, wherein said peripheral strip is fused to the peripheral edge of said window pane.

18. An arrangement as set forth in claim 1, wherein said roof cover is inwardly folded at its peripheral edge to present a window opening, the fold region being sewn.

19. An arrangement as set forth in claim 1, wherein said roof cover is inwardly folded at its peripheral edge to present a window opening, the fold region being adhered.

20. An arrangement as set forth in claim 1, wherein said cover-side peripheral strip includes a fabric frame disposed between the roof cover and the peripheral strip, the fabric frame having an outer edge region sewn to the roof cover and to a support band of the second part of said zip fastener and an inner edge region sewn to said roof cover, said fabric frame having an intended outer side and an intended inner side, the intended outer side of the fabric frame being adjacent the roof cover and its inner side oriented toward said window pane.

21. A method of making a detachable connection between a flexible roof cover presenting a peripheral edge defining a window opening and a window pane presenting a peripheral edge comprising the steps of:
 a. securing a first support band of a divisible zip fastener including a chain portion along the window opening whereby the peripheral edge of the roof forms a peripheral strip covering the chain;
 b. securing a second support band of a divisible zip fastener including a chain portion along the peripheral edge of the window pane whereby the chain portion of the divisible zip fastener is disposed at a distance from the peripheral edge of the window pane;
 c. securing a flexible peripheral strip along the peripheral edge of the window pane with the peripheral strip extending beyond the peripheral edge of the window pane and covers the chain portion of the divisible zip fastener;
 d. inserting the window pane in the window opening and closing the zip fastener;
 e. applying a releasable adhesive between the peripheral strip and the window pane;
 f. activating the adhesive; and
 g. pressing together the peripheral strip and the window pane to establish a sealed adhesive bond.

22. A method as set forth in claim 21, wherein said adhesive is a hot-melt adhesive, and said activating step includes heating the adhesive.

23. A method as set forth in claim 22, wherein an electrical heating resistance conductor is located between the peripheral strip and the window pane, and including the step of applying a voltage to the electrical resistance heating conductor to heat and soften the adhesive.

* * * * *